J. SHARP.
FEEDING MECHANISM.
APPLICATION FILED APR. 8, 1921.
1,422,229.
Patented July 11, 1922.
2 SHEETS—SHEET 1.
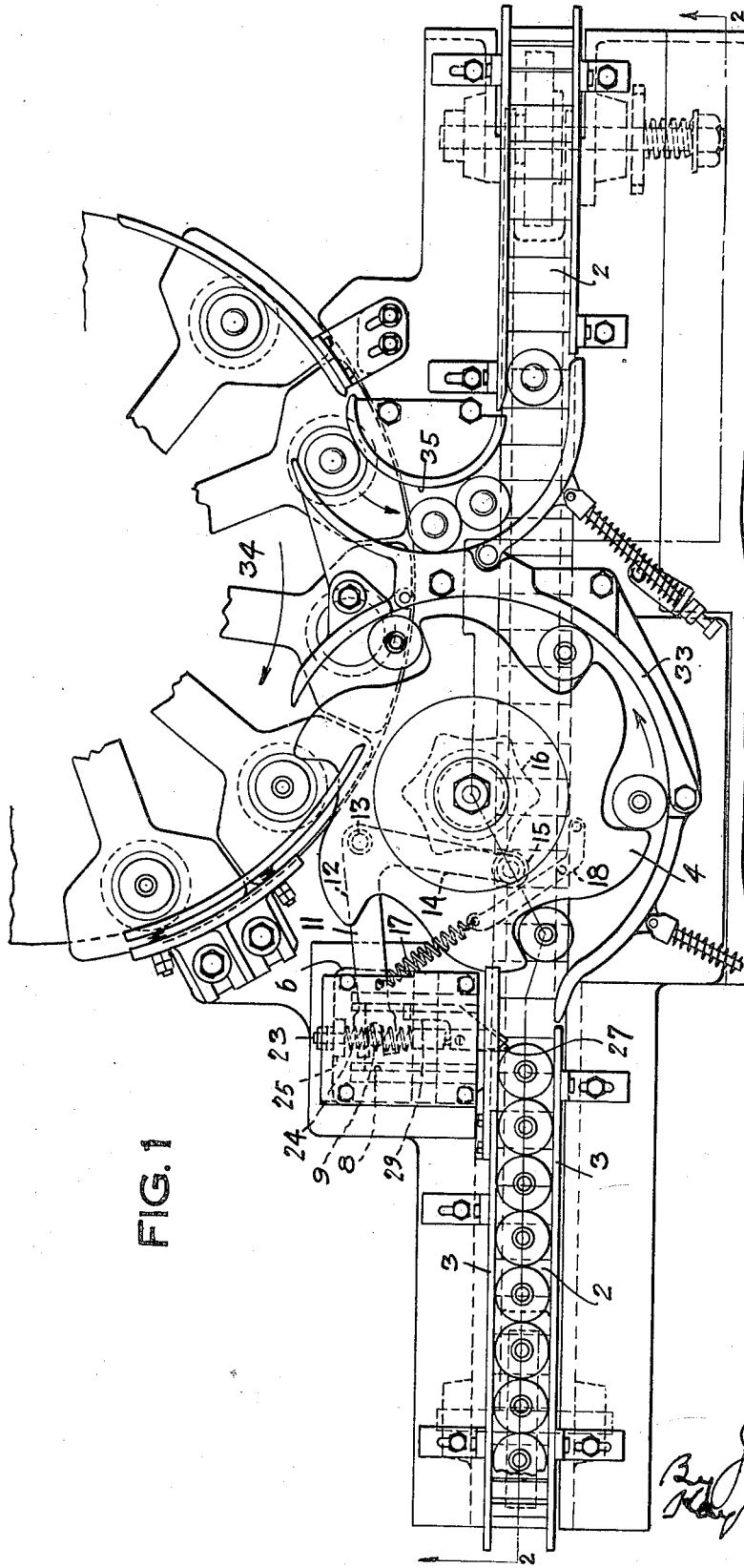
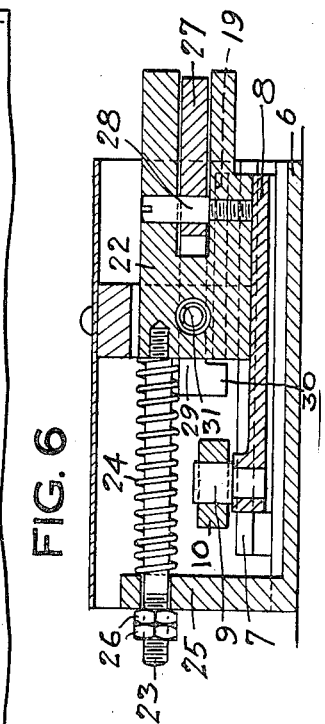
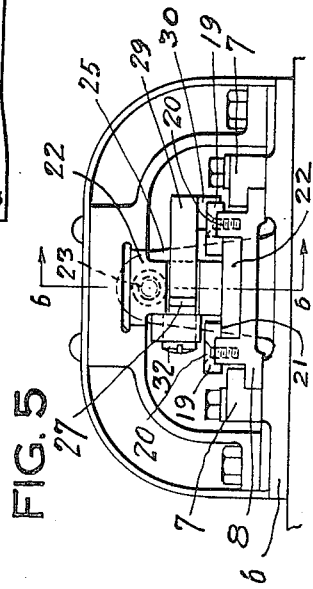
INVENTOR
John Sharp

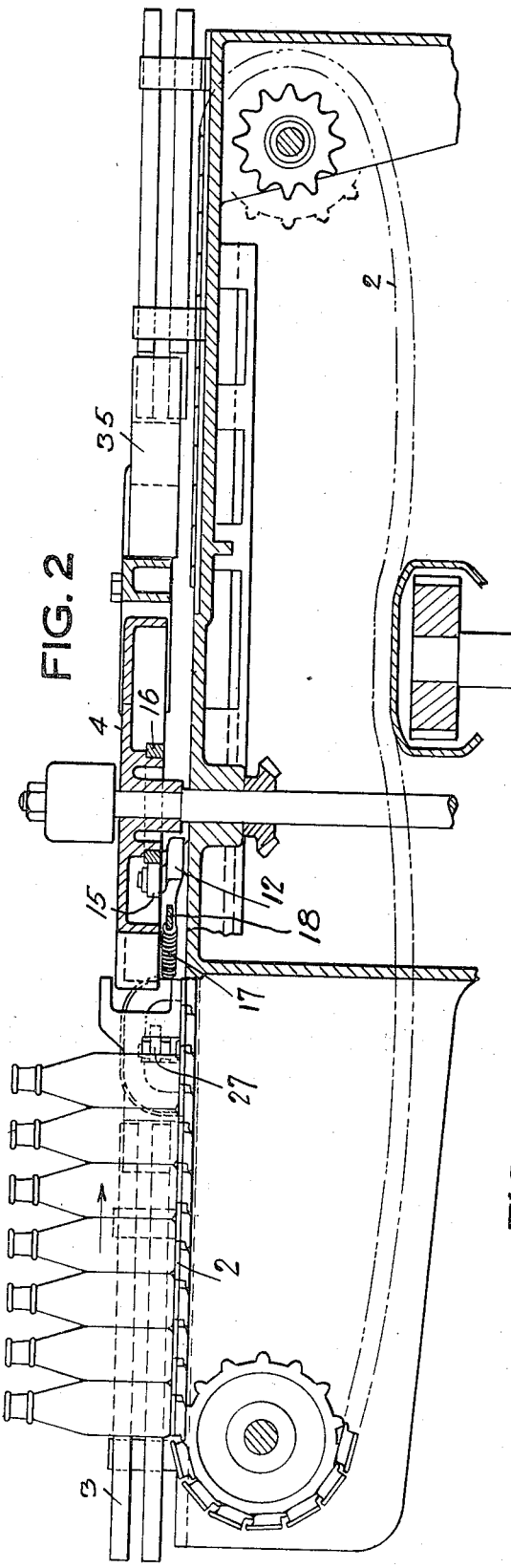
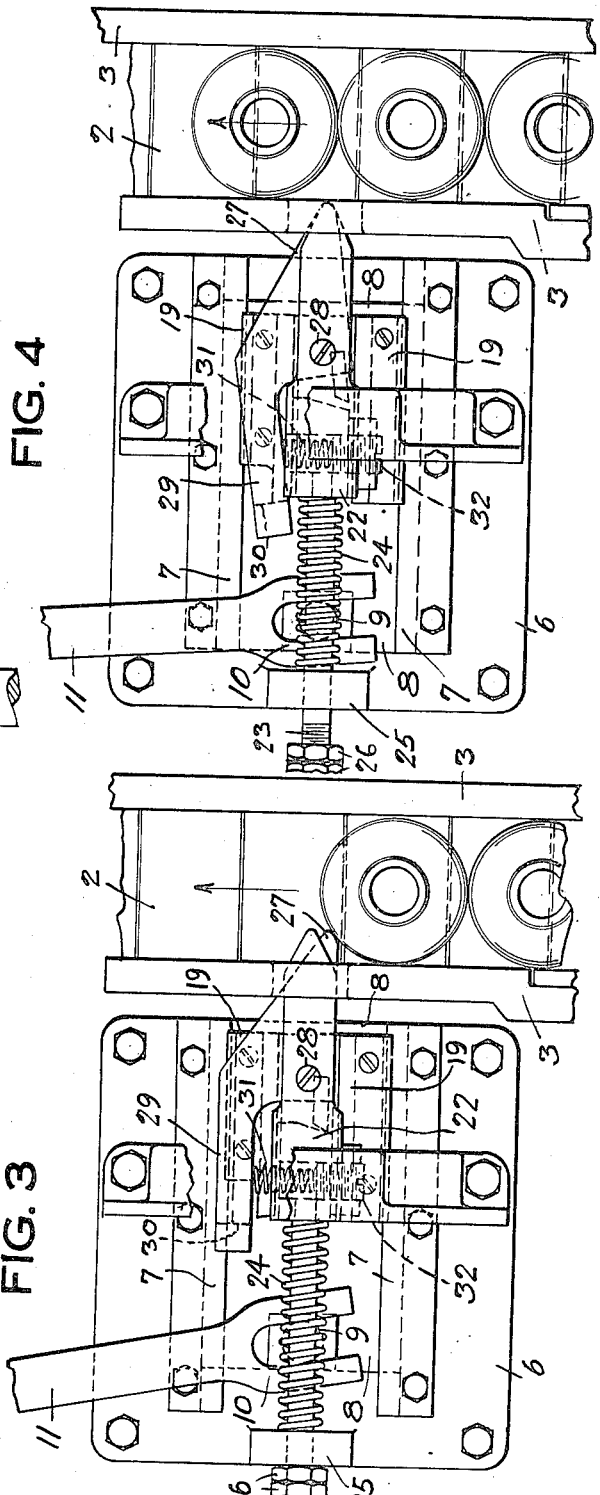

UNITED STATES PATENT OFFICE.

JOHN SHARP, OF OAKMONT, PENNSYLVANIA, ASSIGNOR TO ALUMINUM SEAL COMPANY, OF NEW KENSINGTON, PENNSYLVANIA, A CORPORATION OF PENNSYLVANIA.

FEEDING MECHANISM.

1,422,229.    Specification of Letters Patent.    Patented July 11, 1922.

Application filed April 8, 1921. Serial No. 459,665.

*To all whom it may concern:*

Be it known that I, JOHN SHARP, a citizen of the United States, and resident of Oakmont, in the county of Allegheny and State of Pennsylvania, have invented a new and useful Improvement in Feeding Mechanism; and I do hereby declare the following to be a full, clear, and exact description thereof.

My invention relates to a feeding device adapted for use in connection with bottle-capping machines, although its use may be extended to any sphere where articles are to be fed one by one to a machine where they are subjected to some further operation.

My invention is particularly adapted to bottle-capping machines, for great difficulty has been experienced in such machines, due to the inability up to the present time of providing for the proper feed of the bottles to the machine as well as their delivery from the machine after having been capped. In machines of this class, where a rotary table is employed to which the bottles are fed one by one, and where the caps are applied and secured in place, there is a star wheel in advance of said table to which the bottles are fed one at a time. I provide a timing device for delivering the bottles to the star wheel, said timing device involving a tripper-arm in the path of the filled bottles carried along by an endless conveyer, the object being to hold back enough bottles so that the first bottle, or the one in contact with the tripper-arm, is supported in the rear by the second bottle, the second by the third, etc., as there is a tendency when the bottle is released, unless supported from behind, to tip over, due to the motion of the conveyer on which it is standing.

In the accompanying drawings, Fig. 1 is a plan view of my improved apparatus showing a portion only of the revolving table to which the articles are to be fed; Fig. 2 is a section on the line 2—2, Fig. 1; Fig. 3 is an enlarged plan view of the feeding device proper with the parts in one position; Fig. 4 is a like view showing the parts in position for allowing the bottle or other articles to pass; Fig. 5 is a front view of the feeding device partly in section; and Fig. 6 is a section on the line 6—6, Fig. 5.

My invention is adapted for use in connection with a bottle capping machine such as illustrated and described in an application filed by me October 30, 1918, Serial No. 260,236, although, as above stated, I do not wish to limit its sphere to a machine of that character, or even necessarily to bottle-capping machines, as it may be applied to many different uses where feeding of articles one by one to a machine for the further operation is desired.

In the drawings the numeral 2 indicates an ordinary endless belt conveyer which runs continuously and carries the articles, such as bottles to be capped, between guides 3. In the path of the conveyer 2 is the distributor star-wheel 4.

The feeding device for feeding the articles one by one to the star-wheel 4 is the main part of my invention and may now be described in detail. At one side of the conveyer 2 is a base plate 6 provided with the guide 7 within which the slide member 8 is adapted to move back and forth. The slide member 8, at its rear end, is provided with the pin 9 which is engaged by the forked end 10 of the arm 11 of the bell crank lever 12 pivotally mounted at 13. The inner arm 14 of said bell crank lever 12 has the roller 15 which engages the cam 16 on the star-wheel 4. By this arrangement the slide member 8 is capable of being moved continuously back and forth. A spring 17 is connected to the arm 11 of the bell-crank lever 12 and to the arm 18, said spring acting to advance the slide 8.

Gibs 19 are secured to the slide member 8 by screws 20, and said gibs form the guide 21 for the slide 22, said slide 22 being independent of the continuous back and forth movement of the slide member 8.

Connected to the slide 22 is the rod 23 carrying the spring 24, said spring being interposed between said slide 22 and the rear abutment 25, said rod being provided with the adjusting nuts 26.

Mounted on the slide 22 is the trip-arm 27 pivotally mounted at 28. The trip-arm 27 has the rearwardly extending finger 29 with the downwardly extending lug 30 which is moved into the path of the continuously reciprocating slide member 8, as will more fully hereinafter appear. The spring 31 engages the finger 29 of the trip-arm 27, said spring normally holding said arm in the position indicated in Fig. 3, and to provide for the adjustment of said spring to increase or decrease the tension of same, a screw 32 passing through an opening in the slide 22 engages said spring.

Guides 33 direct the articles when picked up by the star-wheel 4 to the table 34. After the bottles have been capped where the device is used in connection with the feeding of bottles to a capping machine, the bottles are delivered to the guide-way 35 to be directed again to the conveyor 2 to be carried to the packing department. The operation is as follows:

The spring 31 is adjusted to give the required resistance to the movement of the trip-arm according to the size of the bottles to be capped. When once adjusted for the size of the bottles the timer works without further alteration, until a different size bottle is to be capped. The adjustment of the spring 31 is generally such that it requires the friction of the chain conveyor 2 pulling on the bottoms of four or five bottles before the trip-arm is moved. There may be four or five bottles standing behind the trip-arm and it will require the pressure of just one more to trip it, but when this occurs and the bottle moves past the trip-arm, said arm remains stationary until an additional bottle presses against the line already pressing against said trip-arm.

The mechanism is so timed that the cam 16 will be in position to withdraw the slide member 8 when the bottle has moved the trip arm 27 into position where the lug 30 will engage the rear end of said slide member 8, and said slide member will be withdrawn, and due to the fact that the trip-arm 27 is connected to the slide 22, said slide will be likewise withdrawn, allowing the bottle to pass and be moved into position to be picked up by the star-wheel 4. Before another bottle comes in contact with the trip-arm 27, the spring 24 which has been compressed will advance the slide 22, and with it said trip-arm, as said slide is free to move independent of the slide member 8, and the spring 31 will throw the trip-arm out in position to engage the next bottle when the operation just described is repeated.

In this manner the articles will be fed one by one to the star-wheel, and the operations are so timed that the articles will be fed just as they can be taken up by the star-wheel; and there will be no jamming or interference. The fact that the slide member 8 is moving continuously always insures the operation of the device whenever the pressure of the bottles is sufficient to overcome the resistance of the trip-arm, so that there is no chance of the failure of the device to operate, and the articles are fed continuously to the machine in succession, leaving no blank spaces, and consequently the discharge from the machine is equally continuous, and the articles are in such close relation to each other in the guide 35 that, in the case of bottles, they support one another, and there is no liability to the bottles toppling over due to jolting or the vibration of the machine.

What I claim is:

1. In a feeding device, the combination with conveying mechanism, of a spring actuated trip-arm in the path of the article, a reciprocating member adapted to engage said trip-arm when moved by said article, a star-wheel, and connections between said wheel and said reciprocating member for reciprocating the latter.

2. In a feeding device, the combination with conveying mechanism, of a spring actuated trip-arm in the path of the article, a spring-actuated slide on which said tripper is mounted, a slide member in which said slide is mounted, means on said trip-arm adapted to engage said slide member, a star-wheel, a cam on said star wheel, and connections between said slide member and said cam for reciprocating said slide member.

3. In a feeding device, the combination with conveying mechanism, of a spring actuated trip-arm in the path of the articles, a spring-actuated slide on which said trip-arm is mounted, a downwardly projecting lug on said trip-arm, a slide member on which said slide is mounted, a star-wheel, and connections between said star-wheel and said slide member for reciprocating the same.

4. In a feeding device, the combination with conveying mechanism, of a reciprocating slide member, a slide mounted in said slide member, a spring actuated trip-arm carried by said slide, a projection on said trip-arm adapted to be brought into the path of said slide member, a star-wheel, a cam on said star wheel, a lever connected to said slide member, connections between said lever and said cam for imparting a reciprocating movement to said slide member.

In testimony whereof, I, the said JOHN SHARP, have hereunto set my hand.

JOHN SHARP.

Witnesses:
 FRED J. KING,
 E. H. GROBEFEND.